US006581294B2

(12) United States Patent
Svaldi

(10) Patent No.: US 6,581,294 B2
(45) Date of Patent: Jun. 24, 2003

(54) ANGLE FINDER FOR LARGE DUCTS

(76) Inventor: Livio Svaldi, 4253 Bobolink Ter., Skokie, IL (US) 60076-2001

(*) Notice: Subject to any disclaimer, the term of this patent is extended or adjusted under 35 U.S.C. 154(b) by 0 days.

(21) Appl. No.: 10/012,846

(22) Filed: Nov. 3, 2001

(65) Prior Publication Data

US 2003/0084579 A1 May 8, 2003

(51) Int. Cl.[7] ........................ G01C 15/00; G01B 11/26

(52) U.S. Cl. ............................ 33/286; 33/412; 33/520; 33/529; 33/644

(58) Field of Search .......................... 33/286, 227, 228, 33/412, 520, 529, 644, 670, 672, 673, 674, 675, DIG. 21, 391, 333, 334, 354

(56) References Cited

U.S. PATENT DOCUMENTS

| | | | | | |
|---|---|---|---|---|---|
| 548,329 | A | | 10/1895 | Stemmerich | |
| 600,049 | A | * | 3/1898 | Thompson | 33/412 |
| 657,443 | A | | 9/1900 | Newton | |
| 659,513 | A | | 10/1900 | Dubus | |
| 1,127,468 | A | | 2/1915 | McGowan | |
| 2,531,077 | A | * | 11/1950 | Mullin | 33/391 |
| 2,735,190 | A | | 2/1956 | Jordan et al. | |
| 3,173,211 | A | | 3/1965 | Williams | |
| 4,352,247 | A | | 10/1982 | Rohde | |
| 4,835,877 | A | | 6/1989 | Roach et al. | |
| 6,052,911 | A | * | 4/2000 | Davis | 33/286 |
| 6,202,313 | B1 | * | 3/2001 | Yamashita | 33/286 |

* cited by examiner

*Primary Examiner*—Christopher W. Fulton
(74) *Attorney, Agent, or Firm*—Cardinal Law Group

(57) ABSTRACT

An angle finder for large diameter ducts and piping. It consists of a pair of legs having front and back sides, and top and bottom ends. The top ends are pivotally connected, thereby forming an inverted adjustable "V." There also is provided a moveable center pointer having a top and a bottom mounted on the top end of the legs so as to bisect the "V" formed by the legs. Finally, there is a direct reading angle finder, preferably used in conjunction with a laser, mounted near the bottom of the moveable center pointer.

12 Claims, 5 Drawing Sheets

ANGLE FINDER FOR LARGE DUCTS

BACKGROUND OF THE INVENTION

1. Field of the Invention

The invention relates to the field of measuring devices. More specifically, the invention is concerned with determining angles on large diameter ducts or piping.

2. Description of the Prior Art

It is not uncommon in the installation of round ductwork and piping to make angled connections to other ducts or piping along the longitudinal surfaces of such ductwork and piping. To calculate the distance about the circumference that will produce the desired angle, the most commonly used method is as follows: Using a machinist's combination square fitted with a slideable "V"-shaped center finding head, the apex or center point is located. Knowing the arc or angle desired and the diameter of the pipe, the length of the arc is calculated using the following formula:

$$\text{Length}=D/2\times A^{\circ}\times k$$

In the above formula, D is the Diameter of the duct or pipe, A° is the angle whose length from the center point is sought to be determined, and k is the constant 0.01745.

It is evident this procedure requires calculations and the use of a small tool that is not suited for use with large diameter ducts or pipes, hereinafter in the specification and claims collectively called duct(s) having a diameter of at least 12". With large diameter ducts, the use of a machinist's combination square with a center finding head can produce errors in measurement due to the small size of the tool in relation to the diameter of the duct being measured. For instance, typical of ductwork that connects to a large central duct is generally illustrated in FIG. 3.

In another aspect of determining angles for connecting ductwork, it often happens that an existing duct is mounted at ceiling height and it is necessary to create a connection at a place on its longitudinal surface to another duct located below or offset therefrom. When such large ducts are mounted in places that are relatively inaccessible, it is difficult to determine a center point for such ducts.

There are now available direct reading angle finders that, when moved or tilted, give a direct reading on a marked dial of the angle in degrees from a starting point, which is usually level or horizontal. Also, there are available from a number of suppliers direct digital readout angle finders. The angle finders most commonly are circular marked gauges mounted on a flat base that has at its bottom a magnet for holding the angle finder onto ferrous metal surfaces. These devices have been proposed for solving the problems described above, but since their dimension is only within the range of a few inches, they are not suited for use with large diameter ducts. To be useful in measuring angles on large diameter ducts, the measuring device should be capable of making these determinations on a wide variety of ducts having varying diameters. It should also contain marking means, either direct or indirect, for exactly marking a point on the ducts. Further, it should be capable of use on hard to reach ducts and be capable of projecting angles directly from one or more spaced apart ducts, including offset ducts.

SUMMARY OF THE INVENTION

The invention is directed to an angle finder for large diameter ducts and piping. It comprises a pair of legs having front and back sides, and top and bottom ends. The top ends are pivotally connected, thereby forming an inverted adjustable "V." There is a moveable vertical center pointer, having a top and a bottom, mounted on the top end of the legs so as to bisect the "V" formed by the legs. Finally, there is present a direct reading angle finder mounted on the moveable center pointer. In a preferred embodiment, there is a laser mounted below the angle finder.

A preferred species of the angle finder has a horizontal pin attached to the top of the inverted adjustable "V." The moveable center pointer comprises a bar, with its top having a longitudinal slot sized to ride in the pin. In this embodiment, there is provided a pair of arms of equal length having bottom and top ends. The bottom ends are pivotally connected to each other at a point below the longitudinal slot in the bar. Each of the top ends is pivotally connected to equidistant points near the top of the legs.

Further features include the bottom of the moveable center being pointed. The direct reading angle finder and the laser are fitted to a mounting plate having a front and a back. The mounting plate is located on the bottom of the front of the moveable center pointer and is rotatable. The back of the mounting plate has intersecting vertical and horizontal slots dimensioned to receive the bottom of the moveable center pointer. Also, there is provision for a lock for the mounting plate, which preferably is in the form of a spring-loaded pin.

The moveable center pointer desirably has a lock that preferably is the pin upon which the longitudinal slot rides. This pin is threaded and has a wing nut mounted thereon. A final preferred embodiment is that the legs contain slideable pads for protecting the surfaces upon which the angle finder of the invention is used.

BRIEF DESCRIPTION OF THE DRAWINGS

In the drawings, like parts have like numbers.

DETAILED DESCRIPTION OF THE INVENTION

Figure 1:
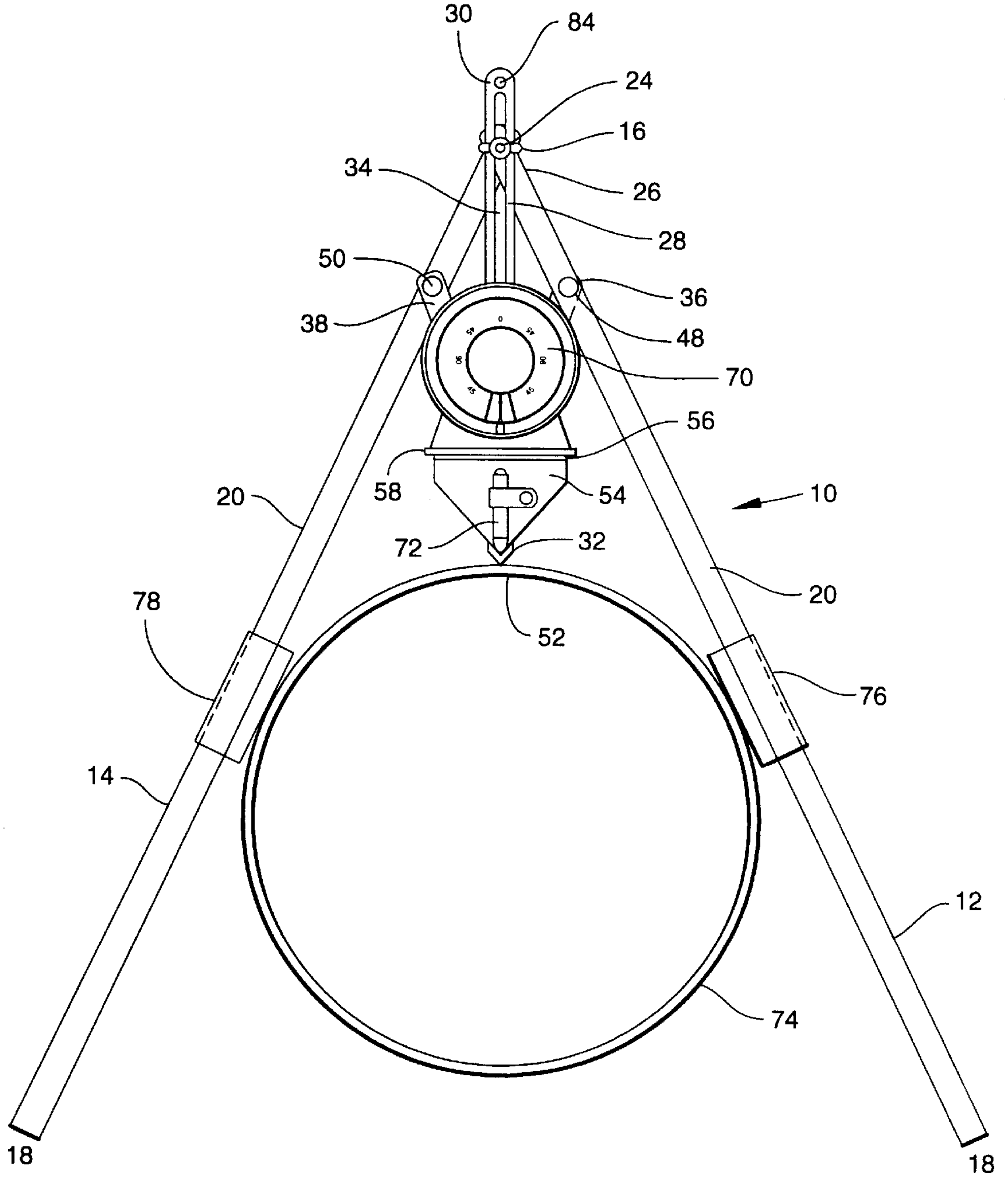
FIG. 1 is a front vertical view showing the angle finder positioned over a large diameter duct and having its pointer resting on the center point of the duct.
Figure 3:
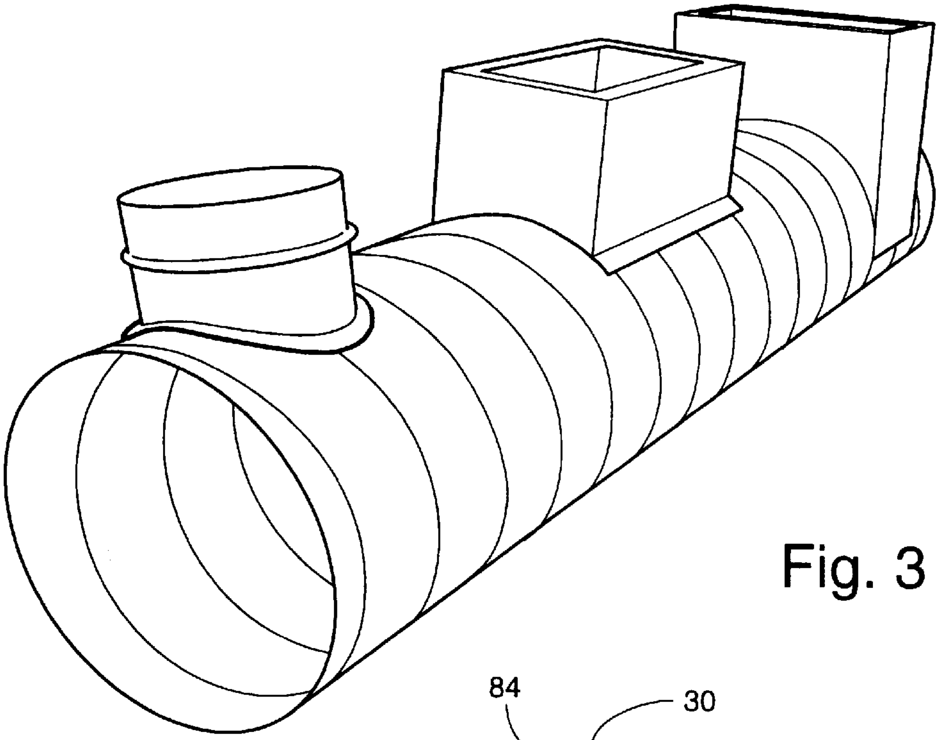
FIG. 3 illustrates the types of angled connecting ducts whose positioning is measured by the angle finder shown in FIG. 1.

There is shown an angle finder device, used for measuring large diameter ducts and piping, generally designated by the numeral 10. Angle finder 10 comprises a pair of legs 12 and 14, having tops 16 and bottoms 18. Legs 12 and 14 also have front sides 20 and back sides 22, which are shown to best advantage in FIG. 2. Legs 12 and 14 at their tops 16 are pivotally connected by means of a pin 24, which is preferably threaded to receive a tightening wing nut 26. This configuration forms an inverted "V," which is adjustable.

There is a moveable center pointer 28, which is vertically disposed, having a top 30 and a bottom 32. The top portion of the moveable center point 28 contains a longitudinal slot 34, which mounts vertically upon pin 24 and is capable of being locked into a fixed position by wing nut 26. It is essential that moveable center pointer 28 bisects the inverted "V" formed by legs 12 and 14.

To maintain moveable center pointer 28 in a position to bisect the inverted "V" as legs 12 and 14 are opened or closed, there is provided a pair of arms 36 and 38. Arms 36 and 38 and their relationship to legs 12 and 14 are shown to best advantage in FIG. 2. Arms 36 and 38 have bottoms 40 and tops 42 and 44. Bottoms 40 are connected by means of a nut and bolt assembly 46, which engages longitudinal slot 34 and, upon which arms 36 and 38 pivot. Nut and bolt assembly 46 rides in longitudinal slot 34 as legs 12 and 14 are opened or closed. Tops 42 and 44 are pivotally connected to the upper portion of legs 12 and 14 by means of nut and bolt assemblies 48 and 50. As shown to best advantage in FIG. 2, this produces a "V" configuration, which allows moveable center pointer 28 to remain in the center of the inverted "V" formed by legs 12 and 14 as they are moved outwardly or inwardly.

Figure 2:
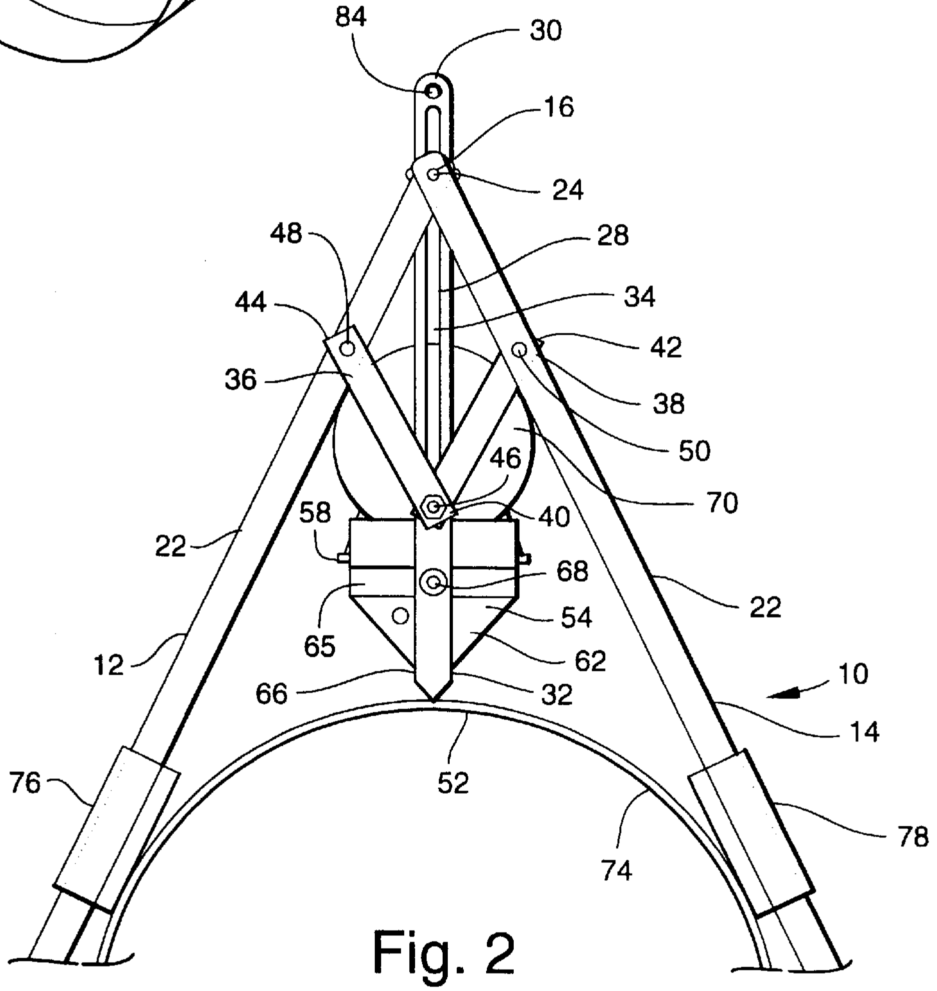
FIG. 2 is partial vertical back view corresponding to FIG. 1.

As shown in FIGS. 1 and 2, tops 42 and 44 of arms 36 and 38 are mounted so that arm 36 is mounted on the back of leg 12, whereas arm 38 is mounted on the back of front of leg 14. This arrangement provides for increased stability of angle finder 10. It should be noted that bottom 32 of moveable center pointer 28 comes to a point 52 to allow the exact positioning of angle finder 10 against a duct upon which it is used.

Fitted upon the front of moveable center pointer 28 below longitudinal slot 34 is mounting plate 54, which is shown to best advantage in FIG. 2. Mounting plate 54 contains on its front face 56 a shelf 58 and an adjustable clamp 60 (see FIGS. 1 and 4). The back face 62 of mounting plate 54 contains a pair of 90 degree intersecting slots 64 and 66. Bottom 32 of moveable center pointer 28 is dimensioned to engage these intersecting slots 64 and 66, and is rotatable upon bottom 32 of moveable center pointer 28 and is locked therein by means of a spring-loaded pin 68 (see FIG. 2). It is evident that this configuration allows moveable plate 54 to be locked into four positions that are 90 degrees apart.

Affixed to shelf 58 is a direct reading angle finder 70. Fitted into removable clip 60, which is also adjustable, is a laser 72. Legs 12 and 14 are provided with a pair of slideable pads 76 and 78 to keep the instrument perpendicular to the longitudinal axis of the tube or round duct 74, and to present marring or scratching of duct 74.

Direct reading angle finder 70 is of a type readily available commercially and is sold by Dasco Products under the trade name AF-100 Angle Finder and Level. There is another model by RaceMart, among others. Direct reading angle finders 70 are typified in the drawings. Other direct reading angle finders (not shown) are digital and may be also be used.

Direct reading angle finder 70 often has a magnetic base and can be fitted onto shelf 58 if mounting plate 54 is made of a ferrous metal. This allows for ready removal of direct reading angle finder 70. Alternatively, direct reading angle finder 70 may be screwed or mounted onto shelf 58. Laser 72 is preferably of the type used as a dot pointer and is well known in the art and is available from many sources.

Figure 5:
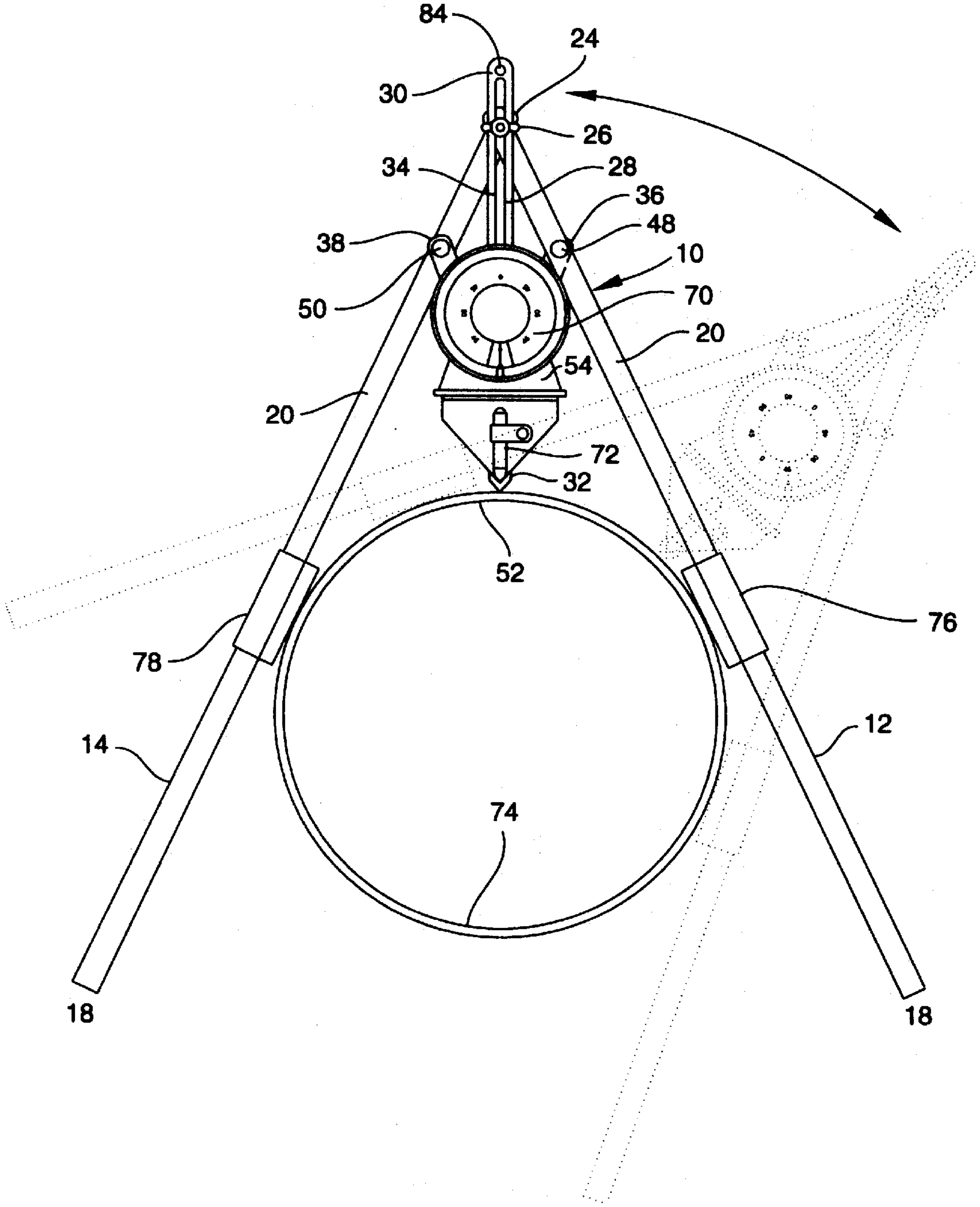
FIG. 5 illustrates how the angle finder is rotated (shown by the broken lines) to determine an angle in relation the center point of a large diameter duct.

FIG. 1 illustrates a typical usage of angle finder 10 of the invention. Legs 12 and 14 are spread apart to a distance so that they will moveably fit over duct 74. Angle finder 10 is adjusted to the left or the right until the direct reading angle finder 70 shows a reading of 0 degrees, or level. At this point, moveable center pointer 28 is moved down until the point nearly touches the center of duct 74. Wing nut 26, which is loosely fitted, is then tightened to maintain the position of point 52 of moveable center pointer 28 against duct 74. A suitable marking instrument may be used to indicate the area upon which point 52 rests. Angle finder 10 is then rotated, either clockwise or counterclockwise, around the circumference of duct 74 until it registers the desired angle for the connection to be made with an inlet or outlet section of ductwork. This is illustrated in FIG. 5, with the dotted portion of the drawing indicating the desired angle upon the circumference of duct 74.

It should be noted that by using the invention, it is possible to accurately determine the angle sought to be measured upon the circumference a large duct without the necessity of using a mathematical formula, or utilizing a small leveling device that can often produce errors due to its diminutive size. The accuracy of the invention is primarily achieved due to the design of the device, which is in the form of a large compass that can straddle large ducts with ease.

Figure 4:
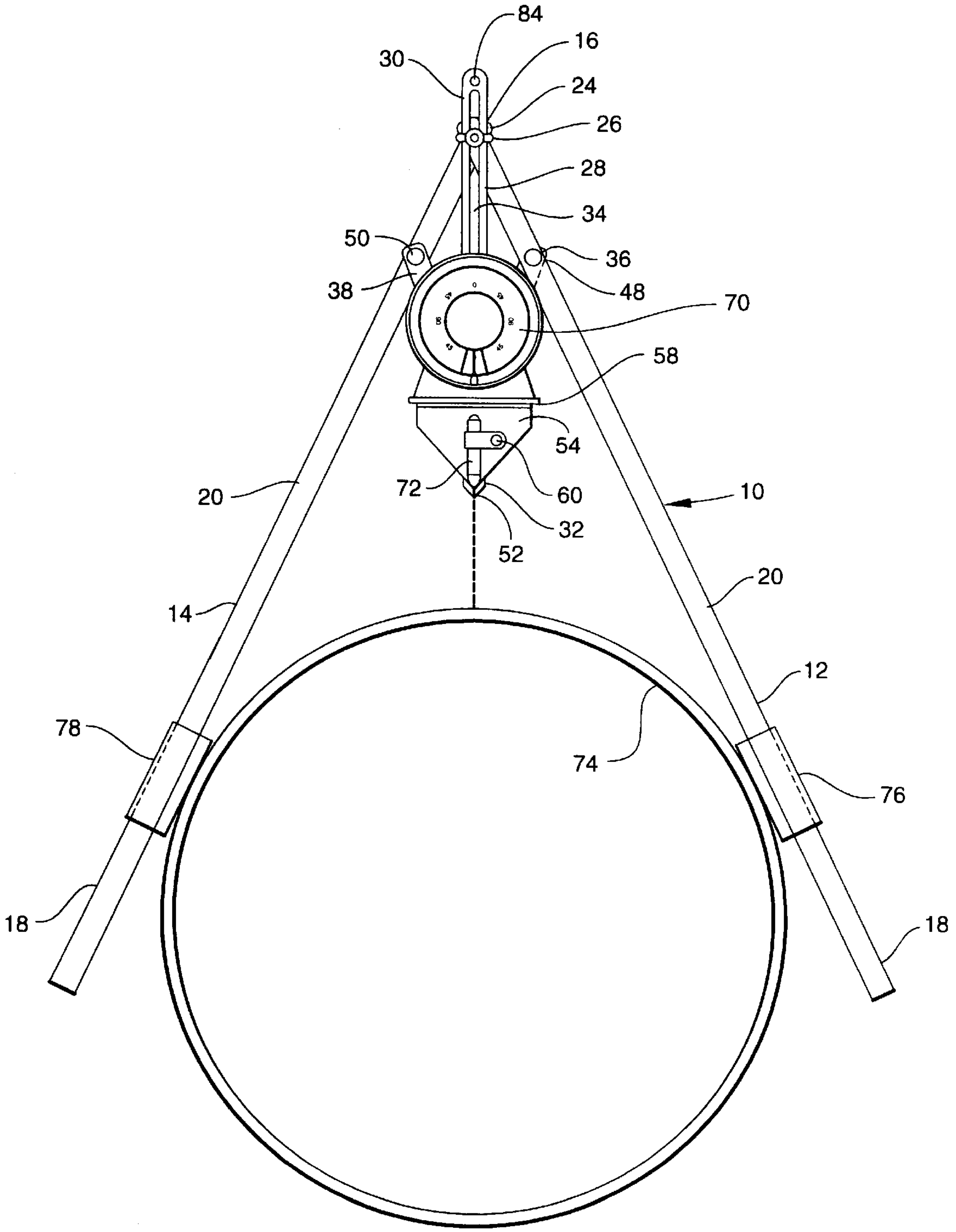
FIG. 4, corresponds to FIG. 1 and shows a laser pointer directed at the center of a duct.

When the circumference of duct 74 is such that angle finder 10 of the invention is incapable of straddling duct 74 to allow moveable center pointer 28 to have the point nearly touching duct 74, then the arrangement shown in FIG. 4 is used, where the legs are moved about the circumference until direct reading angle finder 70 indicates 0 degrees, or level. At this juncture, laser 72 is turned on and produces a dot on the center point of the circumference of duct 74, which can be indicated with a suitable marking instrument.

Figure 6:
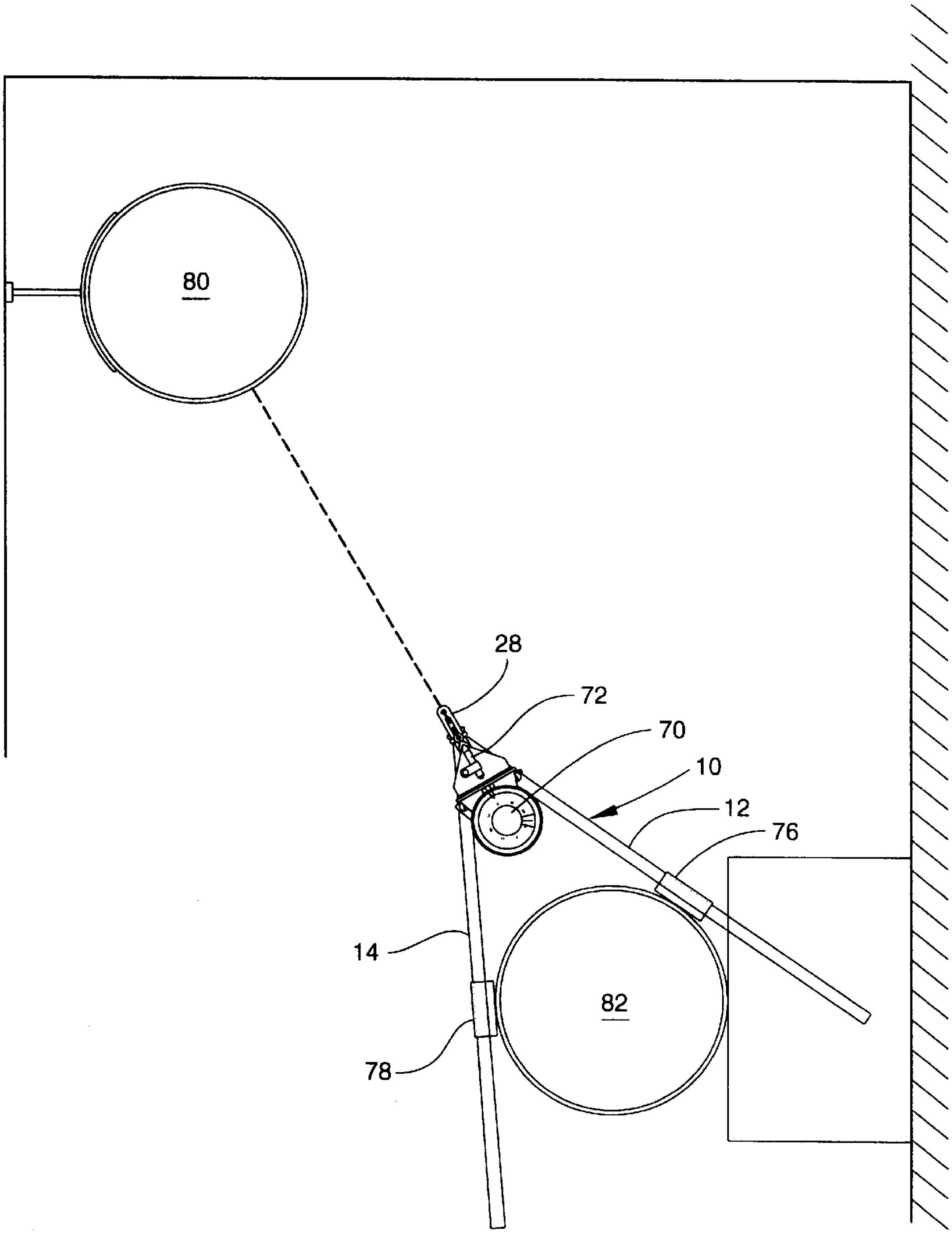
FIG. 6 demonstrates how the angle finder can project a given angle on a duct to another opposed spaced-apart offset duct.

One of the most unique features of the invention is the ability of angle finder 10 to find the center point of ductwork that is extremely inaccessible, such as when ductwork is mounted upon a ceiling. When it is desired to find the center point of such a duct, the arrangement shown in FIG. 6 is employed. The inaccessible duct is generally designated by the numeral 80. In order to connect it to another duct or to product a vent duct, it has been the practice of the art to try to determine the point of entry by measuring it directly on the ceiling duct. As shown in FIG. 6, when it is desired to connect duct 80 to another duct 82 that is lower and adjacent thereto, it is only necessary to rotate mounting plate 54 180 degrees and adjust legs 12 and 14 upon lower duct 82 until the degrees required to accurately connect ducts 80 and 82 are shown on direct reading angle finder 70.

It is evident that the present invention solves a problem heretofore not satisfactorily resolved by prior art measuring devices or methods. The ability to produce direct readings and to accurately find angles on large ductwork has been, at best, not completely addressed by prior art methods and techniques. Also, there has not been any proposed method for easily determining angles and center points of ducts that are difficult to access. In addition, it is within the scope of the invention to provide an angle finder for large diameter ducts that are simply and economically fabricated using relatively available material and apparatus. Metals such as ferrous metals, as well as aluminum and its alloys, are preferred materials that should be used in the fabrication of angle finder 10 of the invention. Angle finder 10 of the invention typically, when in a closed position, will range between four to six feet in height and desirably contains a mounting hole 84 at the top of moveable center pointer 28 (see particularly FIGS. 2 and 4).

Having thus described my invention, I hereby claim as follows.

What is claimed is:

1. An angle finder for large diameter ducts comprising:

a pair of legs having front and back sides, and top and bottom ends, with the top ends being pivotally connected, thereby forming an inverted adjustable "V;"

a moveable center pointer, having a top and a bottom, mounted on the top end of the legs so as to bisect the "V" formed by the legs; and, a direct reading angle finder mounted on the moveable center pointer.

2. The angle finder of claim 1, where there is a laser mounted below the angle finder.

3. The angle finder of claim 1, comprising:

a horizontal pin attached to the top of the inverted adjustable "V;"

the moveable center pointer comprising a bar, with its top having a longitudinal slot sized to ride in the pin;

a pair of arms of equal length, having bottom and top ends, with the bottom ends being pivotally connected to each other at a point below the longitudinal slot in the bar, and with each of the top ends being pivotally connected to equidistant points near the top of the legs.

4. The angle finder of claim 1, where the bottom of the moveable center is pointed.

5. The angle finder of claim 1, where the direct reading angle finder and the laser are fitted to a mounting plate having a front and a back located on the bottom of the front of the moveable center pointer.

6. The angle finder of claim 5, where the mounting plate is rotatable.

7. The angle finder of claim 5, where the back of the mounting plate has intersecting vertical and horizontal slots dimensioned to receive the bottom of the moveable center pointer.

8. The angle finder of claim 5, where the mounting plate has a lock.

9. The angle finder of claim 8, where the lock is a spring-loaded pin.

10. The angle finder of claim 1, where the moveable center pointer has a lock.

11. The angle finder of claim 10, where the lock comprises the pin upon which the longitudinal slot rides is threaded and has a wing nut mounted thereon.

12. The angle finder of claim 1, where the legs contain slideable pads.

* * * * *